(12) United States Patent
Iwuchukwu

(10) Patent No.: US 8,948,794 B2
(45) Date of Patent: Feb. 3, 2015

(54) METHODS AND APPARATUSES FOR FACILITATING PROVISION OF A MAP RESOURCE

(75) Inventor: Tochukwu Iwuchukwu, Mountain View, CA (US)

(73) Assignee: Nokia Corporation, Espoo (FI)

( * ) Notice: Subject to any disclaimer, the term of this patent is extended or adjusted under 35 U.S.C. 154(b) by 85 days.

(21) Appl. No.: 13/047,027

(22) Filed: Mar. 14, 2011

(65) Prior Publication Data

US 2012/0238250 A1 Sep. 20, 2012

(51) Int. Cl.
*H04W 4/00* (2009.01)
*H04W 4/18* (2009.01)
*G06F 17/30* (2006.01)
*G01C 21/36* (2006.01)
*G08G 1/0969* (2006.01)
*H04L 29/08* (2006.01)

(52) U.S. Cl.
CPC ........... *H04W 4/18* (2013.01); *G06F 17/30905* (2013.01); *G01C 21/3667* (2013.01); *G08G 1/0969* (2013.01); *H04L 67/2833* (2013.01)
USPC .......... 455/466; 455/456.3; 701/532

(58) Field of Classification Search
USPC ....................................................... 455/466
See application file for complete search history.

(56) References Cited

U.S. PATENT DOCUMENTS

| | | | |
|---|---|---|---|
| 6,085,226 A | 7/2000 | Horvitz | |
| 6,243,761 B1 | 6/2001 | Mogul et al. | |
| 6,438,592 B1 | 8/2002 | Killian | |
| 6,874,019 B2 | 3/2005 | Hamilton, II et al. | |
| 7,296,089 B2 | 11/2007 | Krishnamurthy et al. | |
| 7,548,982 B2 | 6/2009 | Gu et al. | |
| 8,788,762 B2 | 7/2014 | Iwuchukwu | |
| 2004/0030493 A1* | 2/2004 | Pechatnikov et al. | 701/208 |
| 2006/0025923 A1* | 2/2006 | Dotan et al. | 701/207 |
| 2006/0058953 A1* | 3/2006 | Cooper et al. | 701/208 |
| 2007/0219708 A1 | 9/2007 | Brasche et al. | |
| 2007/0233817 A1 | 10/2007 | Johnson et al. | |
| 2007/0242084 A1* | 10/2007 | Bowman et al. | 345/629 |
| 2008/0015770 A1* | 1/2008 | Nomura | 701/200 |
| 2008/0114543 A1 | 5/2008 | Vishnu | |
| 2008/0208789 A1 | 8/2008 | Almog | |
| 2008/0227473 A1 | 9/2008 | Haney | |
| 2008/0318597 A1* | 12/2008 | Berns et al. | 455/456.5 |
| 2009/0281718 A1 | 11/2009 | Gibran et al. | |
| 2010/0205292 A1 | 8/2010 | Diaz | |
| 2011/0182475 A1 | 7/2011 | Fairfield et al. | |
| 2011/0191014 A1* | 8/2011 | Feng et al. | 701/200 |

FOREIGN PATENT DOCUMENTS

EP 2 120 014 A1 11/2009

OTHER PUBLICATIONS

International Search Report and Written Opinion for Application No. PCT/IB2011/053359 dated Feb. 13, 2012.

* cited by examiner

*Primary Examiner* — Mazda Sabouri

(74) *Attorney, Agent, or Firm* — Alston & Bird LLP

(57) ABSTRACT

Methods and apparatuses are provided for facilitating provision of a map resource. A method may include causing a request for a plurality of portions of a map to be sent to a map source. The method may further include receiving the requested plurality of portions of the map in a single response message. A corresponding apparatus is also provided.

17 Claims, 6 Drawing Sheets

METHODS AND APPARATUSES FOR FACILITATING PROVISION OF A MAP RESOURCE

TECHNOLOGICAL FIELD

Example embodiments of the present invention relate generally to communications technology and, more particularly, relate to methods and apparatuses for facilitating provision of a map resource.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

As a result of the expansion in networks and evolution of mobile computing devices, mobile computing devices are increasingly being used to access data resources over networks. One such data resource that may be accessed over a network is a map resource. In this regard, a computing device may access a map resource from a map source to use for navigational purposes, trip planning, and/or the like.

BRIEF SUMMARY

Systems, methods, apparatuses, and computer program products are herein provided for facilitating provision of a map resource. Systems, methods, apparatuses, and computer program products in accordance with various example embodiments may provide several advantages to computing devices, computing device users, network operators, map service providers, and operators of data servers. In this regard, some example embodiments may enhance performance of map servers and clients. More particularly, some example embodiments enable the provision by a map source of a plurality of portions of a map to a client device in a single response message. Accordingly, a client device may leverage knowledge of future requests for map portions to request multiple portions of a map in a single request. In this regard, some example embodiments disclosed herein may offer improved response time and reduced network communication costs. Accordingly, end users may realize improved performance of map applications, while network operators and map service providers may realize reduced network communication costs through the transmission of fewer requests and responses compared with prior systems that only allow for request and transmission of a single map portion at a time.

In a first example embodiment, a method is provided, which comprises causing a request for a plurality of portions of a map to be sent to a map source. The method of this example embodiment further comprises receiving the requested plurality of portions of the map in a single response message.

In another example embodiment, an apparatus comprising at least one processor and at least one memory storing computer program code is provided. The at least one memory and stored computer program code are configured, with the at least one processor, to cause the apparatus of this example embodiment to at least cause a request for a plurality of portions of a map to be sent to a map source. The at least one memory and stored computer program code are configured, with the at least one processor, to further cause the apparatus of this example embodiment to receive the requested plurality of portions of the map in a single response message.

In a further example embodiment, a computer program product is provided. The computer program product of this example embodiment includes at least one computer-readable storage medium having computer-readable program instructions stored therein. The program instructions of this example embodiment comprise program instructions configured to cause a request for a plurality of portions of a map to be sent to a map source. The program instructions of this example embodiment further comprise program instructions configured to cause receipt of the requested plurality of portions of the map in a single response message.

In another example embodiment, an apparatus is provided that comprises means for causing a request for a plurality of portions of a map to be sent to a map source. The apparatus of this example embodiment further comprises means for receiving the requested plurality of portions of the map in a single response message.

In a further example embodiment, a method is provided, which comprises receiving a request for a plurality of portions of a map. The method of this example embodiment further comprises, responsive to the received request, causing the requested plurality of portions of the map to be sent in a single response message.

In another example embodiment, an apparatus comprising at least one processor and at least one memory storing computer program code is provided. The at least one memory and stored computer program code are configured, with the at least one processor, to cause the apparatus of this example embodiment to at least receive a request for a plurality of portions of a map. The at least one memory and stored computer program code are configured, with the at least one processor, to further cause the apparatus of this example embodiment, responsive to the received request, to cause the requested plurality of portions of the map to be sent in a single response message.

In yet another example embodiment, a computer program product is provided. The computer program product of this example embodiment includes at least one computer-readable storage medium having computer-readable program instructions stored therein. The program instructions of this example embodiment comprise program instructions configured to cause a request for a plurality of portions of a map to be received. The program instructions of this example embodiment further comprise program instructions configured, responsive to the received request, to cause the requested plurality of portions of the map to be sent in a single response message.

In still a further example embodiment, an apparatus is provided that comprises means for receiving a request for a plurality of portions of a map. The apparatus of this example embodiment further comprises, means for, responsive to the received request, causing the requested plurality of portions of the map to be sent in a single response message.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
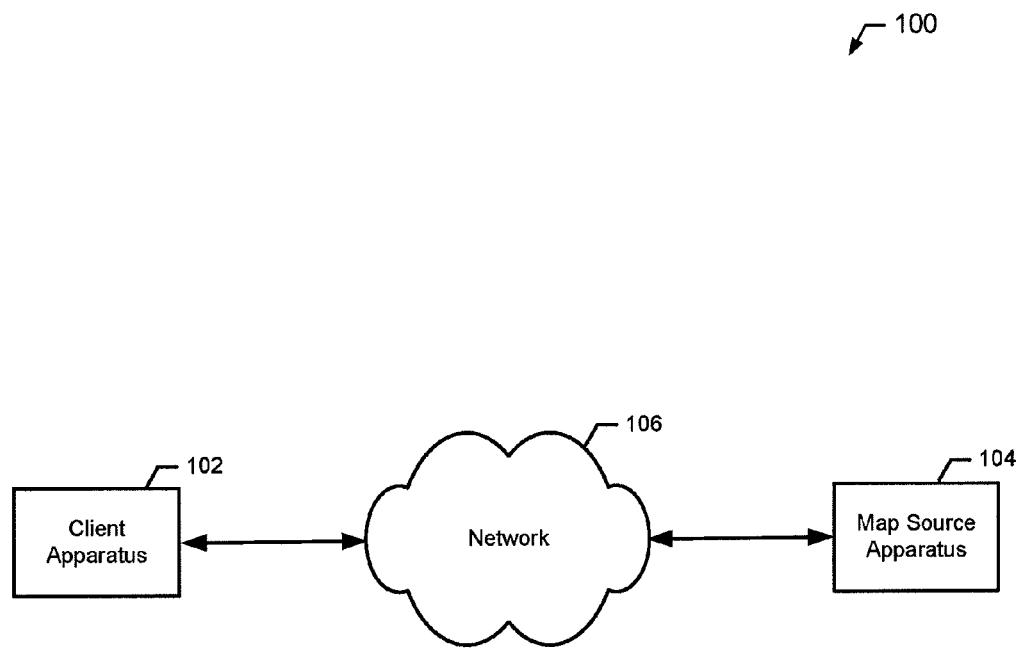
FIG. 1 illustrates a system for facilitating provision of a map resource according to some example embodiments.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Current systems for provision of map resources may suffer from performance issues due to a request-response time required for a map source to respond to a client request. In this regard, a client may send a plurality of requests for individual portions of a map to a server and receive a plurality of responses, each containing only a single portion of the map. As an example, a client may implement a map application needing to fetch a set of n map tiles. The n map tiles may be fetched by the client through issuance of n sequential requests to a server. Assume that the average network time for a client to send a request to a map source for a portion of a map is $t_1$ and the average network time for the map source to send a response including the requested portion of the map to the client is $t_2$. Then the total request-response time for n requests is approximately $n*(t_1+t_2)$. Some example embodiments disclosed herein may significantly reduce this total request-response time by facilitating request by a client of a plurality of portions of a map in a single request and response by a map source to such a request by including the requested plurality of portions of the map in a single response message. Accordingly, such example embodiments may reduce the total request-response time for n portions of a map to approximately $t_1+*(n*t_2)$.

Referring now to FIG. 1, FIG. 1 illustrates a block diagram of a system 100 for facilitating provision of a map resource according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating provision of a map resource, numerous other configurations may also be used to implement embodiments of the present invention.

In at least some embodiments, the system 100 includes a client apparatus 102 and map source apparatus 104. The client apparatus 102 and map source apparatus 104 may be configured to communicate over the network 106. The network 106 may comprise one or more wireless networks (for example, a cellular network, wireless local area network, wireless personal area network, wireless metropolitan area network, and/or the like), one or more wireline networks, or some combination thereof, and in some embodiments comprises at least a portion of the interne.

The client apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the client apparatus 102 may be embodied as any computing device configured to request at least a portion of a map from the map source apparatus 104 over the network 106 and receive requested portion(s) of the map from the map source apparatus 104 in response to the request, in accordance with one or more of the example embodiments described further herein below.

The map source apparatus 104 may be embodied as one or more servers, a server cluster, a cloud computing infrastructure, one or more desktop computers, one or more laptop computers, one or more mobile computers, one or more network nodes, multiple computing devices in communication with each other, a chipset, an apparatus comprising a chipset, any combination thereof, and/or the like. More particularly, the map source apparatus 104 may comprise any computing device or plurality of computing devices configured to communicate with a client apparatus 102 over the network 106 to receive a request for at least a portion of a map and to provide the requested portion(s) of the map to the client apparatus 102 in response to the request, in accordance with one or more of the example embodiments described further herein below.

Figure 2:
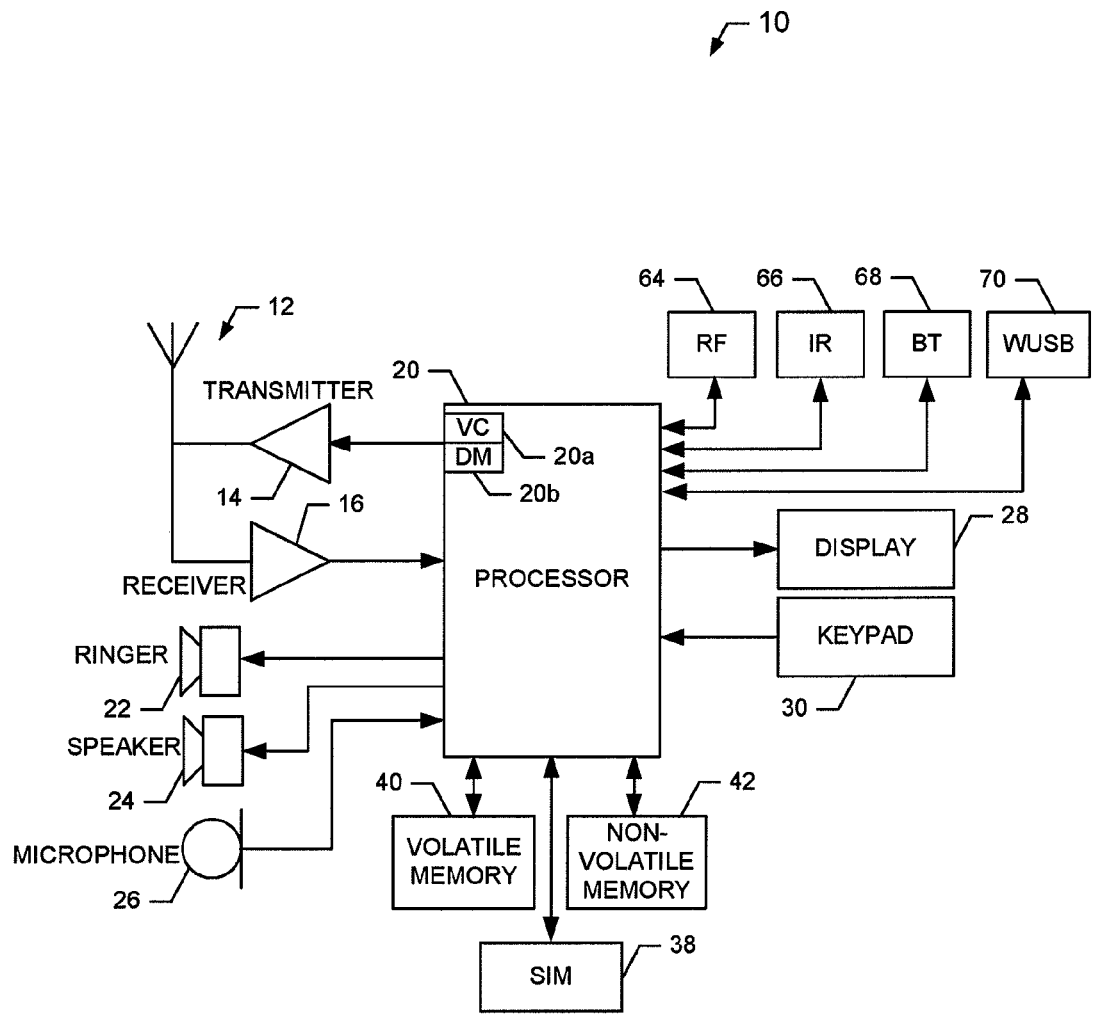
FIG. 2 is a schematic block diagram of a mobile terminal according to some example embodiments.

In some example embodiments, the client apparatus 102 may be embodied as a mobile terminal, such as that illustrated in FIG. 2. In this regard, FIG. 2 illustrates a block diagram of a mobile terminal 10 representative of some example embodiments of a client apparatus 102. It should be understood, however, that the mobile terminal 10 illustrated and hereinafter described is merely illustrative of one type of client apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively.

The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), any future communication protocol, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
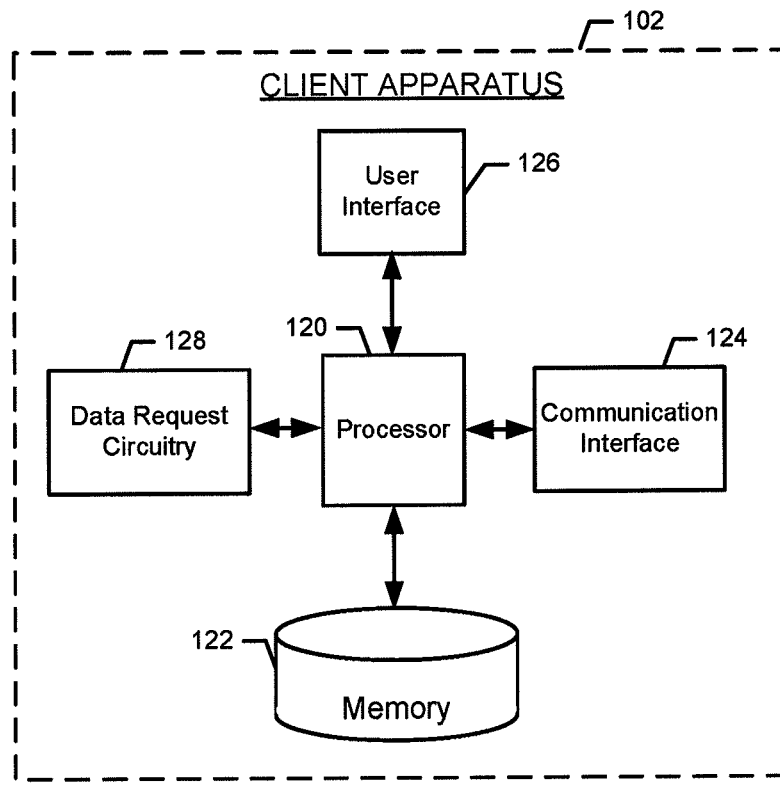
FIG. 3 illustrates a block diagram of a client apparatus according to some example embodiments.

Referring now to FIG. 3, FIG. 3 illustrates a block diagram of a client apparatus 102 according to some example embodiments. As illustrated in FIG. 3, the client apparatus 102 may include various means for performing the various functions herein described. These means may comprise one or more of a processor 120, memory 122, communication interface 124, user interface 126, or data request circuitry 128. The means of the client apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the client apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or data request circuitry 128 may be embodied as a chip or chip set. The client apparatus 102 may therefore, in some example embodiments, be configured to implement embodiments of the present invention on a single chip or as a single "system on a chip." As another example, in some example embodiments, the client apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 120 may comprise a plurality of processors. The plurality of processors may be in operative communication with each other and may be collectively configured to perform one or more functionalities of the client apparatus 102 as described herein. The plurality of processors may be embodied on a single computing device or distributed across a plurality of computing devices collectively configured to function as the client apparatus 102. In embodiments wherein the client apparatus 102 is embodied as a mobile terminal 10, the processor 120 may be embodied as or comprise the processor 20. In some example embodiments, the processor 120 may be configured to execute instructions stored in the memory 122 or otherwise accessible to the processor 120. These instructions, when executed by the processor 120, may cause the client apparatus 102 to perform one or more of the functionalities of the client apparatus 102 as described herein. As such, whether configured by hardware or software methods, or by a combination thereof, the processor 120 may comprise an entity capable of performing operations according to one or more example embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the client apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In some example embodiments wherein the client apparatus 102 is embodied as a mobile terminal 10, the memory 122 may comprise the volatile memory 40 and/or the non-volatile memory 42. The memory 122 may be configured to store information, data, applications, instructions, or the like for enabling the client apparatus 102 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the data request circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the client apparatus 102 and one or more computing devices or computing resources may be in communication. As an example, the communication interface 124 may be configured to enable communication between the client apparatus 102 and the map source apparatus 104 over a network (for example, the network 106). The communication interface 124 may additionally be in communication with the memory 122, user interface 126, and/or data request circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or data request circuitry 128, such as via a bus.

The data request circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In some example embodiments wherein the data request circuitry 128 is embodied separately from the processor 120, the data request circuitry 128 may be in communication with the processor 120. The data request circuitry 128 may further be in communication with one or more of the memory 122, communication interface 124, or user interface 126, such as via a bus.

Figure 4:
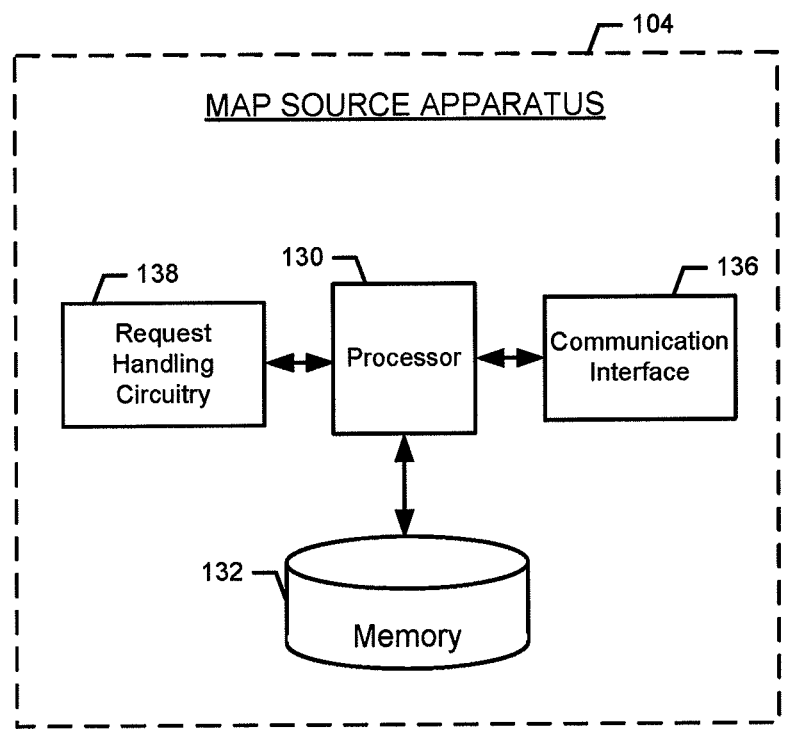
FIG. 4 illustrates a block diagram of a map source apparatus according to some example embodiments.

FIG. 4 illustrates a block diagram of a map source apparatus 104 according to an example embodiment. As illustrated in FIG. 4, the map source apparatus 104 may include one or more means for performing the various functions herein described. These means may comprise one or more of a processor 130, memory 132, communication interface 136, or request handling circuitry 138. The means of the map source apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 4 may be embodied as a chip or chip set. In other words, the map source apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 136, and/or request handling circuitry 138 may be embodied as a chip or chip set. The map source apparatus 104 may therefore, in some example embodiments, be configured to implement embodiments of the present invention on a single chip or as a single "system on a chip." As another example, in some example embodiments, the map source apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 130 comprises a plurality of processors. The plurality of processors may be in operative communication with each other and may be collectively configured to perform one or more functionalities of the map source apparatus 104 as described herein. The plurality of processors may be embodied on a single computing device or distributed across a plurality of computing devices collectively configured to function as the map source apparatus 104. In some example embodiments, the processor 130 is configured to execute instructions stored in the memory 132 or otherwise accessible to the processor 130. These instructions, when executed by the processor 130, may cause the map source apparatus 104 to perform one or more of the functionalities of the map source apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the map source apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the map source apparatus 104 to carry out various functions in accordance with various example embodiments. For example, in some example embodiments, the memory 132 is configured to buffer input data for processing by the processor 130. Additionally or alternatively, the memory 132 may be configured to store program instructions for execution by the processor 130. The memory 132 may store information in the form of static and/or dynamic information. The stored information may, for example, include one or more maps and/or portions thereof. This stored information may be stored and/or used by the request handling circuitry 138 during the course of performing its functionalities.

The communication interface 136 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. In some example embodiments, the communication interface 136 is at least partially embodied as or otherwise controlled by the processor 130. In this regard, the communication interface 136 may be in communication with the processor 130, such as via a bus. The communication interface 136 may include, for example, an antenna, a transmitter, a receiver, a transceiver and/or supporting hardware or software for enabling communications with one or more remote computing devices. The communication interface 136 may be configured to receive and/or transmit data using any protocol that may be used for communications between computing devices. In this regard, the communication interface 136 may be configured to receive and/or transmit data using any protocol that may be used for transmission of data over a wireless network, wireline network, some combination thereof, or the like by which the map source apparatus 104 and one or more computing devices or computing resources may be in communication. As an example, the communication interface 136 may be configured to enable communication between the map source apparatus 104 and the client apparatus 102 over a network (for example, the network 106). The communication interface 136 may additionally be in communication with the memory 132 and/or request handling circuitry 138, such as via a bus.

The request handling circuitry 138 may be embodied as various means, such as circuitry, hardware, a computer program product comprising computer readable program instructions stored on a computer readable medium (for example, the memory 132) and executed by a processing device (for example, the processor 130), or some combination thereof and, in some embodiments, is embodied as or otherwise controlled by the processor 130. In some embodiments wherein the request handling circuitry 138 is embodied separately from the processor 130, the request handling circuitry 138 may be in communication with the processor 130. The request handling circuitry 138 may further be in communication with one or more of the memory 132 or communication interface 136, such as via a bus.

In some example embodiments, the data request circuitry 128 is configured to control and/or communicate with a client application that may be run on the client apparatus 102. The client application may, for example, be executed by the processor 120. The client application may, for example, comprise a map application, such as a navigation application, a trip planning application, a traffic condition application, and/or the like; a web browser running a map application; or the like. In this regard, the client application may comprise any application that may request and/or receive map resources from the map source apparatus 104. Received map resources (e.g., a received portion(s) of a map) may, for example, be used by the client application to provide an image, video, audio, other data, a service, and/or the like that may be used in a map application to a user of the client apparatus 102.

The data request circuitry 128 may be configured to determine a plurality of portions of a map to request. In this regard, a map may be divided into a plurality of discrete portions that collectively comprise the map. In this regard, a portion of a map may have a defined position with respect to one or more adjacent portions. A portion of a map may have any shape. As a non-limiting example, a portion of a map may have a square or rectangular shape, and may be referred to as a "tile." Accordingly, in some example embodiments, a map may be divided into a plurality of tiles, each having a common defined size. Thus, each tile of a map of some example embodiments may have a defined row and column position relative to one or more other tiles that collectively comprise the map or an area thereof. It will be appreciated, however, that a portion of a map is not limited to embodiment as a square or rectangle. In this regard, a portion of a map may have any shape, including any type of polygon shape, an irregular shape (e.g., a jigsaw puzzle shape), or the like.

In various example embodiments, the data request circuitry 128 may determine the plurality of portions of a map to request based on any factor or combination of multiple factors. As an example, a map application or user thereof may request to view a specific map or area of the map, and the data request circuitry 128 may determine the portions that comprise the requested map or area of the map. The data request circuitry 128 may additionally determine to request one or more portions of the map adjacent to portions of the map requested by a map application or user thereof. As another example, the data request circuitry 128 may anticipate one or more portions of a map that is being viewed by a user or that is requested by a user that may be needed next. As an example, it may be anticipated that a user may desire to pan a map to view a portion of a map outside of a viewport in which a portion of the map is displayed. Accordingly, the data request circuitry 128 may determine to request one or more portions of a map adjacent to a portion of the map that is displayed to a user. As still a further example, the data request circuitry 128 may determine to request a plurality of adjacent portions of the map that collectively have a size sufficient to fill a display area (e.g., a viewport) in which the map will be displayed by the client device 102.

The data request circuitry 128 may be further configured to format a request (e.g., an HTTP request) for a plurality of portions of a map. The formatted request may, for example, individually identify each of the plurality of requested portions of the map. As another example, the formatted request may only identify a subset of the requested plurality of portions of the map, but may include information sufficient to enable the map source apparatus 104 to determine any requested portions of the map that are not specifically identified in the request. The data request circuitry 128 may be additionally configured to cause the client apparatus 102 to send a formatted request for a plurality of portions of a map to the map source apparatus 104.

The request handling circuitry 138 may be configured to receive a request for a plurality of portions of a map that is sent by a client apparatus 102. The request handling circuitry 138 may determine the requested portions of the map based at least in part on information included in the request. The request handling circuitry 138 may, if necessary, access the requested portions of the map from a memory, such as the memory 132. The request handling circuitry 138 may format a single response message comprising the requested portions of the map and cause the response message to be sent to the client apparatus 102 in response to the request. In this regard, the response may, for example, include one or more images, each of which may be representative of one or more requested portions of the map.

The data request circuitry 128 may receive the response message sent by the map source apparatus 104 and may extract the requested portions of the map from the response message. One or more of the portions of the map received in the response message may accordingly be rendered and displayed by a map application so that they may be viewed by a user of the client apparatus 102.

In some example embodiments, a request for a plurality of portions of a map may include an identifier for each of the requested portions. Accordingly, a request for n portions of a map may include n identifiers. An identifier may comprise any identifier sufficient to uniquely identify a requested portion of a map. In this regard, an identifier may, for example, comprise a name of a requested portion, a numeric identifier of a requested portion, an alphanumeric identifier of a requested portion, a coordinate or location reference of a requested portion, or the like. In such embodiments, the request handling circuitry 138 may accordingly determine the requested map portions based on the identifiers included in a received request. A response sent by the map source apparatus 104 in such embodiments may comprise the identifier for each portion of the map that is included in the response. In some example embodiments, the response may comprise an object including (1) the size of each map portion image (e.g., tile image) in the response; and (2) the set of map portion images (e.g., tile images). Accordingly, the data request circuitry 128 may correctly associate each image in a received response with the correct portion of the map when the map or area thereof is rendered by the client device 102. Alternatively, some example embodiments may reduce the amount of data (e.g., metadata) included in a response sent by the map source apparatus 104. In this regard, rather than including identifiers of map portions or other metadata identifying map portions included in the response, the request handling circuitry 138 may order images corresponding to the requested portions of the map in the response to correspond to an order in which the requested portions were identified in the request. Accordingly, the data request circuitry 128 may determine the identity of the map images included in a response based at least in part on an order in which the requested portions of the map were requested in the request sent to the map source apparatus 104.

In some instances, the portions of a map requested by the client apparatus 102 may not correspond to randomly dispersed locations on the map, but rather may comprise adjacent portions of a map. In such instances, the data request circuitry 128 may be configured to reduce the size of a request by not individually identifying each requested portion in the request. In this regard, the data request circuitry 128 may instead include an identifier of only a first requested portion of the map in the request and may define a boundary of an area of the map that comprises the requested portions of the map with respect to the identified portion of the map. As an example where a map is divided into tiles, the request may indicate the tile identifier of the first tile (e.g., the leftmost and uppermost tile) in a rectangular "block" of tiles to retrieve and indicate the number of rows and columns in the block.

In response to receipt of a request identifying only a first requested portion of the map and defining a boundary of an area of the map with respect to the first portion, the request handling circuitry 138 may determine the portions of the map requested by a client apparatus 102 by determining the plurality of portions that comprise the area of the map. A response including the plurality of portions that comprise the area of the map defined in the request may comprise the identifier for each of the portions included in the response. In some example embodiments, the response may comprise an object including (1) the size of each map portion image (e.g., tile image) in the response; and (2) the set of map portion images (e.g., tile images). However, in some example embodiments, the response may order the map portion images (e.g., tile images) in the response in a predetermined order understood by both the client apparatus 102 and map source apparatus 104. For example, the map portion images may, for example, be arranged in the response in a "row-by-row" or "column-by-column" ordering. Since the order of the map portion images in the response is pre-determined, the map portion identifier for each map portion image in the response may be determined by the data request circuitry 128. Accordingly, metadata identifying the map portion images may not be included in the response in some such example embodiments wherein the ordering of the map portion images is predetermined.

In some example embodiments, the request handling circuitry 138 may be configured to send a response comprising only a single composite image comprised of the requested portions of the map rather than a plurality of individual images corresponding to each of the requested map portions. In this regard, the request handling circuitry 138 may be configured to generate a composite image, such as a Portable Network Graphics (PNG) formatted image, by combining the requested portions of the map into a single image. Accordingly, the amount of metadata included in the response may be reduced, since identifiers and/or size information may not be required for multiple images. Further, such example embodiments may be compatible with map applications that expect only a single image in response to a request rather than a complex object or other response that may include multiple images.

In some example embodiments, the data request circuitry 128 may indicate in a request that the client apparatus 102 is capable of receiving a composite image and/or that the client apparatus 102 expects to receive a composite image in response to the request. The request handling circuitry 138 may be configured to generate a response comprising a composite image rather than a plurality of images in response to such an indication.

As an example, the request handling circuitry 138 may receive a request for a 2×2 tile block that includes an indication that the map source apparatus 104 is to return a composite image rather than individual tile images. The request handling circuitry 138 may generate an empty image having a size of the combined pixel width and height of the requested tiles. Thus, for example, if a tile is a 256×256 pixel image, then the request handling circuitry 138 may generate a 512×512 pixel image to correspond to the 2×2 tile block request. The request handling circuitry 138 may further render each requested tile into the appropriate position in the new image to generate the composite image. Accordingly, using the instant example, rather than return a response with four tile images, each of size 256×256 pixels, the map source apparatus 104 may return a single image of size 512×512 pixels that is a composite of the four requested tiles.

Operation of an example embodiment will now be described. In this example, a map application (e.g., a navigation application, traffic application, or the like) may be launched on the client apparatus 102, such as by opening a dedicated application, entering a Uniform Resource Locator (URL) into a web browser, or the like. The map application may display a street view of a map on the client apparatus 102. As a user pans the map, the data request circuitry 128 may compute the set of map tiles to be fetched from the map source apparatus 104, such as based on the current viewport on the client apparatus 102. The data request circuitry 128 may format and issue a request (e.g., an HTTP GET request) for the determined set of map tiles to the map source apparatus 104. As an example, the following HTTP GET request may be sent to the map source apparatus 104:

http://maps.nokiaresearch.com/atlas?basemap=street&x=100&y=100&z=10&x=101&y=100&z=10&x=100&y=101&z=10&x=101&y=101&z=10

In response to receiving the request, the request handling circuitry 138 may, for example, create a response (e.g., an object) with the following fields: field 1 may contain the size in bytes of the image (e.g., PNG image) of tile x=100,y=100, z=10; field 2 may contain the image (e.g., PNG image) of the tile; field 3 may contain the size in bytes of the image (e.g., PNG image) of tile x=101,y=100,z=10; field 4 may contain the image (e.g., PNG image) of the tile; field 5 may contain the size in bytes of the image (e.g., PNG image) of tile x=100,y=101,z=10; field 6 may contain the image (e.g., PNG image) of the tile; field 7 may contain the size in bytes of the image (e.g., PNG image) of tile x=101,y=101,z=10; field 8 may contain the image (e.g., PNG image) of the tile. The map source apparatus 104 may send the response to the client apparatus 102. The data request circuitry 128 may use the fields containing the size of the images to extract the image for each requested tile from the response for display by the map application. In some example embodiments, the request handling circuitry 138 may order images corresponding to the requested portions of the map in the response to correspond to an order in which the requested portions were identified in the request. Accordingly, the data request circuitry 128 may determine the identity of the map images included in a response based at least in part on an order in which the requested portions of the map were requested in the request sent to the map source apparatus 104.

As another example, the data request circuitry 128 may format and issue a request (e.g., an HTTP GET request) for the determined set of map tiles to the map source apparatus 104 identifying a single tile and defining a boundary of an area comprised of a plurality of tiles with respect to the identified tile. As an example, the following HTTP GET request may be sent to the map source apparatus 104:

```
http://maps.nokiaresearch.com/atlas?basemap=street&x=100&y=
  100&z=10&rows=2&cols=2
```

In response to receiving the request, the request handling circuitry 138 may, for example, create a response (e.g., an object) with the following fields: field 1 may contain the size in bytes of the image of tile x=100,y=100,z=10; field 2 may contain the image of the tile; field 3 may contain the size in bytes of the image of tile x=101,y=100,z=10; field 4 may contain the image of the tile; field 5 may contain the size in bytes of the image of tile x=100,y=101,z=10; field 6 may contain the image of the tile; field 7 may contain the size in bytes of the image of tile x=101,y=101,z=10; field 8 may contain the image of the tile. Accordingly, the example response includes the tiles that comprise the 2×2 tile area having an upper, leftmost tile with the location identifier x=100,y=100,z=10. Note that in this example the tile images have been arranged "row-by-row" in the response, but other arrangements are possible.

The map source apparatus 104 may send the response to the client apparatus 102. The data request circuitry 128 may use the fields containing the size of the images to extract the image for each requested tile from the response for display by the map application.

As another example, the data request circuitry 128 may format and issue a request (e.g., an HTTP GET request) for the determined set of map tiles to the map source apparatus 104 that requests that a single composite image be returned in response to the request. As an example, the following HTTP GET request may be sent to the map source apparatus 104:

```
http://maps.nokiaresearch.com/atlas?basemap=street&x=100&y=
  100&z=10&rows=2&cols=2&image=composite
```

Assuming, for example, that the requested map tiles are 256×256 pixels, the request handling circuitry 138 may, in response to receiving the request, create a new empty 512× 512 pixel image (e.g., PNG image). At pixel location (0,0) in the new image, the request handling circuitry 138 may render the image of the tile x=100,y=100,z=10. At pixel location (256,0) in the new image, the request handling circuitry 138 may render the image of the tile x=101,y=100,z=10. At pixel location (0,256) in the new image, the request handling circuitry 138 may render the image of the tile x=100,y=101, z=10. At pixel location (256,256) in the new image, the request handling circuitry 138 may render image of the tile x=101,y=101,z=10. The map source apparatus 104 may send the created composite image to the client apparatus 102 in response to the request. The map application may display the received composite image on the client apparatus 102.

Figure 5:
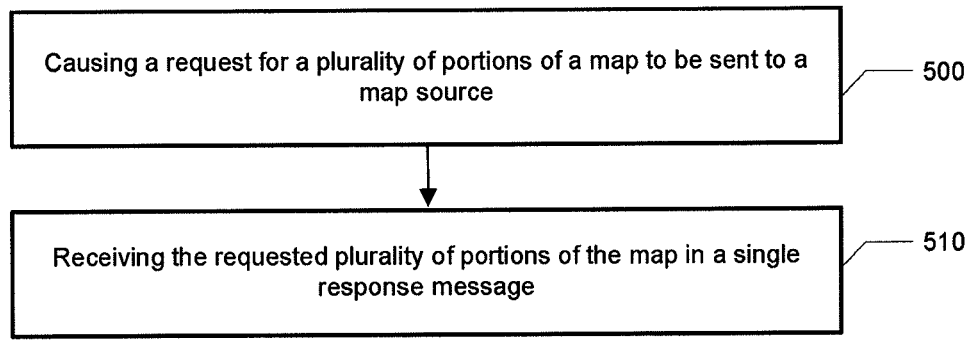
FIG. 5 illustrates a flowchart according to an example method for facilitating provision of a map resource according to some example embodiments.

FIG. 5 illustrates a flowchart according to an example method for facilitating provision of a map resource in accordance with some example embodiments. In this regard, FIG. 5 illustrates operations that may be performed at the client apparatus 102. The operations illustrated in and described with respect to FIG. 5 may, for example, be performed by, with the assistance of, and/or under the control of one or more of the processor 120, memory 122, communication interface 124, user interface 126, or data request circuitry 128. Operation 500 may comprise causing a request for a plurality of portions of a map to be sent to the map source apparatus 104. The request may comprise an identifier for each of the requested portions. Alternatively, the request may comprise an identifier for each of only a subset of the requested portions (e.g., for a single portion) and may define a boundary of an area comprised of the requested portions to enable the map source apparatus 104 to determine the other requested portions. The processor 120, memory 122, communication interface 124, and/or data request circuitry 128 may, for example, provide means for performing operation 500. Operation 510 may comprise receiving the requested plurality of portions of the map in a single response message. In this regard, the response message may comprise a plurality of images corresponding to each of the respective requested portions. Alternatively, the response message may comprise a composite image that is comprised of the requested portions of the map. The processor 120, memory 122, communication interface 124, and/or data request circuitry 128 may, for example, provide means for performing operation 510.

Figure 6:
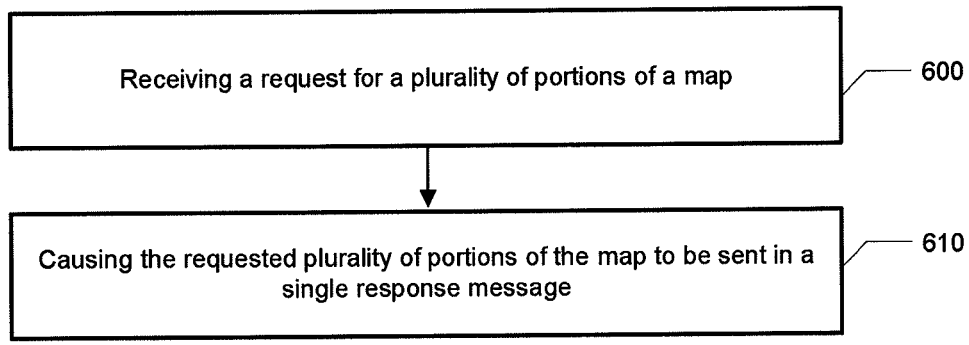
FIG. 6 illustrates a flowchart according to another example method for facilitating provision of a map resource according to some example embodiments.

FIG. 6 illustrates a flowchart according to another example method for facilitating provision of a map resource in accordance with some example embodiments. In this regard, FIG. 6 illustrates operations that may be performed at the map source apparatus 104. The operations illustrated in and described with respect to FIG. 6 may, for example, be performed by, with the assistance of, and/or under the control of one or more of the processor 130, memory 132, communication interface 136, or request handling circuitry 138. Operation 600 may comprise receiving a request for a plurality of portions of a map. The request may comprise an identifier for each of the requested portions. Alternatively, the request may comprise an identifier for each of only a subset of the requested portions (e.g., for a single portion) and may define a boundary of an area comprised of the requested portions to enable the map source apparatus 104 to determine the other requested portions. The processor 130, memory 132, communication interface 136, and/or request handling circuitry 138 may, for example, provide means for performing operation 600. Operation 610 may comprise causing the requested portions of the map to be sent to the client apparatus 102 in a single response message. In this regard, the response message may comprise a plurality of images corresponding to each of the respective requested portions. Alternatively, the response message may comprise a composite image that is comprised of the requested portions of the map. The processor 130, memory 132, and/or request handling circuitry 138 may, for example, provide means for performing operation 610.

FIGS. 5-6 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122 and/or in the memory 132) and executed by a processor in the computing device (for example, by the processor 120 and/or by the processor 130). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a client apparatus 102 and/or a map source apparatus 104) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a client apparatus 102 and/or a map source apparatus 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 120 and/or processor 130) may provide all or a portion of the elements. In another embodiment, all or a portion of the elements may be configured by and operate under control of a computer program product. The computer program product for performing the methods of an example embodiment includes a computer-readable storage medium (for example, the memory 122 and/or memory 132), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   causing a request for a plurality of portions of a map to be sent to a map source, the request being a network request identifying the plurality of portions of the map;
   receiving, by a processor, the requested plurality of portions of the map in a single response message, wherein the requested plurality of portions are received as a composite image comprising each of the requested plurality of portions of the map, wherein the response message does not include meta-data identifying the plurality of portions of the map; and
   determining an identity of each of the plurality of portions of the map included in the response message based at least in part on an order in which the plurality of portions of the map are included in the network request.

2. The method of claim 1, further comprising determining, based at least in part on one or more of a size of a display area for displaying the map or a portion of the map that is currently displayed, a plurality of portions of the map to request, and wherein the requested plurality of portions of the map comprise the determined plurality of portions of the map.

3. The method of claim 1, wherein:
   causing the request to be sent comprises causing a request individually identifying each of the requested plurality of portions of the map to be sent to the map source.

4. The method of claim 1, wherein:
   causing the request to be sent comprises causing a request identifying only a first portion of the map and defining a boundary of an area of the map comprised of a plurality of portions with respect to the identified first portion to be sent to the map source; and
   receiving the requested plurality of portions of the map comprises receiving the plurality of portions of the map that comprise the area of the map in a single response message.

5. An apparatus comprising at least one processor and at least one memory storing computer program code, wherein the at least one memory and stored computer program code are configured, with the at least one processor, to cause the apparatus to at least:
   cause a request for a plurality of portions of a map to be sent to a map source, the request being a network request identifying the plurality of portions of the map;
   receive the requested plurality of portions of the map in a single response message, wherein the requested plurality of portions are received as a composite image comprising each of the requested plurality of portions of the map, wherein the response message does not include meta-data identifying the plurality of portions of the map; and
   determining an identity of each of the plurality of portions of the map included in the response message based at least in part on an order in which the plurality of portions of the map are included in the network request.

6. The apparatus of claim 5, wherein the at least one memory and stored computer program code are configured, with the at least one processor, to further cause the apparatus to determine, based at least in part on one or more of a size of a display area for displaying the map or a portion of the map that is currently displayed, a plurality of portions of the map to request, and wherein the requested plurality of portions of the map comprise the determined plurality of portions of the map.

7. The apparatus of claim 5, wherein the at least one memory and stored computer program code are configured, with the at least one processor, to cause the apparatus to:
cause the request to be sent at least in part by causing a request individually identifying each of the requested plurality of portions of the map to be sent to the map source.

8. The apparatus of claim 5, wherein the at least one memory and stored computer program code are configured, with the at least one processor, to cause the apparatus to:
cause the request to be sent at least in part by causing a request identifying only a first portion of the map and defining a boundary of an area of the map comprised of a plurality of portions with respect to the identified first portion to be sent to the map source; and
receive the requested plurality of portions of the map at least in part by receiving the plurality of portions of the map that comprise the area of the map in a single response message.

9. The apparatus of claim 5, wherein the apparatus comprises or is embodied on a mobile phone, the mobile phone comprising user interface circuitry and user interface software stored on one or more of the at least one memory; wherein the user interface circuitry and user interface software are configured to:
facilitate user control of at least some functions of the mobile phone through use of a display; and
cause at least a portion of a user interface of the mobile phone to be displayed on the display to facilitate user control of at least some functions of the mobile phone.

10. A method comprising:
receiving a request for a plurality of portions of a map, the request being a network request identifying the plurality of portions of the map;
responsive to the received request, generating a composite image comprising each of the requested plurality of portions of the map;
causing, by a processor, the composite image to be sent in a single response message, wherein the response message does not include meta-data identifying the plurality of portions of the map; and
determining an identity of each of the plurality of portions of the map included in the response message based at least in part on an order in which the plurality of portions of the map are included in the network request.

11. The method of claim 10, wherein the request individually identifies each of the requested plurality of portions of the map.

12. The method of claim 10, wherein the request identifies only a first portion of the map and defines a boundary of an area of the map comprised of a plurality of portions with respect to the identified first portion, the method further comprising:
determining, based at least in part on the identified first portion and the defined boundary, the plurality of portions that comprise the area of the map; and
wherein causing the requested plurality of portions of the map to be sent comprises causing the determined plurality of portions of the map that comprise the area of the map to be sent in a single response message.

13. The method of claim 10,
wherein causing the requested plurality of portions of the map to be sent comprises causing the composite image to be sent.

14. An apparatus comprising at least one processor and at least one memory storing computer program code, wherein the at least one memory and stored computer program code are configured, with the at least one processor, to cause the apparatus to at least:
receive a request for a plurality of portions of a map, the request being a network request identifying the plurality of portions of the map;
responsive to the received request, generate a composite image comprising each of the requested plurality of portions of the map;
cause the composite image to be sent in a single response message, wherein the response message does not include meta-data identifying the plurality of portions of the map; and
determining an identity of each of the plurality of portions of the map included in the response message based at least in part on an order in which the plurality of portions of the map are included in the network request.

15. The apparatus of claim 14, wherein the request individually identifies each of the requested plurality of portions of the map.

16. The apparatus of claim 14, wherein the request identifies only a first portion of the map and defines a boundary of an area of the map comprised of a plurality of portions with respect to the identified first portion, and wherein the at least one memory and stored computer program code are configured, with the at least one processor, to further cause the apparatus to:
determine, based at least in part on the identified first portion and the defined boundary, the plurality of portions that comprise the area of the map; and
cause the requested plurality of portions of the map to be sent at least in part by causing the determined plurality of portions of the map that comprise the area of the map to be sent in a single response message.

17. The apparatus of claim 14, wherein the at least one memory and stored computer program code are configured, with the at least one processor, to further cause the apparatus to:
cause the requested plurality of portions of the map to be sent at least in part by causing the composite image to be sent in the response message.

* * * * *